United States Patent
Chen et al.

(10) Patent No.: US 12,421,364 B2
(45) Date of Patent: Sep. 23, 2025

(54) IDENTIFIABLE SUBSTRATE, IDENTIFIABLE ADHESIVE TAPE APPLYING THE SAME AND PREPARATION METHOD OF IDENTIFIABLE ADHESIVE TAPE

(71) Applicant: Dongguan Aozon New Material Technology Co., Ltd., Guangdong (CN)

(72) Inventors: Peng Chen, Guangdong (CN); Qinghua Hu, Guangdong (CN); Jian Gao, Guangdong (CN)

(73) Assignee: Dongguan Aozon New Material Technology Co., Ltd., Dongguan (CN)

( * ) Notice: Subject to any disclaimer, the term of this patent is extended or adjusted under 35 U.S.C. 154(b) by 134 days.

(21) Appl. No.: 18/385,900

(22) Filed: Oct. 31, 2023

(65) Prior Publication Data
US 2024/0059851 A1  Feb. 22, 2024

Related U.S. Application Data

(63) Continuation of application No. PCT/CN2022/100946, filed on Jun. 24, 2022.

(30) Foreign Application Priority Data

Mar. 30, 2022 (CN) .......................... 202210324947.2
Mar. 30, 2022 (CN) .......................... 202220721652.4

(51) Int. Cl.
C08J 7/04 (2020.01)
C09J 7/25 (2018.01)

(52) U.S. Cl.
CPC ............. *C08J 7/0427* (2020.01); *C09J 7/255* (2018.01); *C08J 2367/02* (2013.01);
(Continued)

(58) Field of Classification Search
CPC .. C08J 7/0427; C08J 2367/02; C08J 2467/06; C09J 7/255; C09J 2301/122;
(Continued)

(56) References Cited

FOREIGN PATENT DOCUMENTS

| CN | 114196345 A | | 3/2022 | |
| DE | 10227084 A1 | * | 1/2004 | ............. B31D 1/021 |

(Continued)

OTHER PUBLICATIONS

Machine translation of DE-10227084-A1 (Year: 2004).*
Machine translation of EP-1777249-A1 (Year: 2007).*
Machine translation of KR-20010057569-A (Year: 2001).*

*Primary Examiner* — Patricia L. Nordmeyer (57) ABSTRACT

Provided in the present application is an identifiable substrate, including a base film and a marking layer, the base film including an identifying surface, the marking layer is an ink coating, in which the marking layer is laminated with the identifying surface of the base film; a surface tension of the identifying surface is D1; a surface tension of the marking layer is D2; and a thickness of the marking layer H satisfies $0.8\ \mu m \leq H \leq (D1/D2) \times 5\ \mu m$. In the present solution, the relative surface tension of the base film and the marking layer reflects the surface effect of the lamination between the base film and the marking layer. A thickness range of the marking layer is determined based thereon, so that the ink load on the surface of the base film is effectively controlled within the threshold value of the base film.

20 Claims, 2 Drawing Sheets

(52) U.S. Cl.
CPC ...... *C08J 2467/06* (2013.01); *C09J 2301/122* (2020.08); *C09J 2421/00* (2013.01); *C09J 2433/00* (2013.01); *C09J 2467/006* (2013.01)

(58) Field of Classification Search
CPC ................ C09J 2421/00; C09J 2433/00; C09J 2467/006; C09J 2203/33; C09J 7/22; C09J 7/29
See application file for complete search history.

(56) References Cited

FOREIGN PATENT DOCUMENTS

| | | | | |
|---|---|---|---|---|
| EP | 1777249 A1 | * | 4/2007 | ........... B29C 55/026 |
| KR | 20010057569 A | * | 7/2001 | |

* cited by examiner

IDENTIFIABLE SUBSTRATE, IDENTIFIABLE ADHESIVE TAPE APPLYING THE SAME AND PREPARATION METHOD OF IDENTIFIABLE ADHESIVE TAPE

CROSS-REFERENCE TO RELATED APPLICATIONS

The present application is a continuation application of PCT application No. PCT/CN2022/100946 filed on Jun. 24, 2022, which claims the benefit of Chinese Patent Application Nos. 202210324947.2 and 202220721652.4 filed on Mar. 30, 2022. The contents of all of the aforementioned applications are incorporated by reference herein in their entirety.

FIELD OF THE INVENTION

The present application relates to the field of adhesive materials, in particular to an identifiable substrate, an identifiable adhesive tape applying the same and a preparation method of the identifiable adhesive tape.

BACKGROUND OF THE INVENTION

With the development of national new energy industry, the market demand for lithium batteries is rapidly soaring. The manufacturing of lithium batteries involves many materials and processes, while existing technology is not yet able to ensure that each step and each type of material to achieve the full qualification rate. However, there are great safety risks when unqualified lithium batteries are put into the market, so it is necessary to trace the information of lithium batteries to achieve effective management and safety identification of lithium batteries, reducing the safety risks, and achieving effective sharing of information in the circulation of lithium batteries.

In order to effectively trace each battery and its materials throughout the process, a method currently adopted by lithium battery manufacturers is to adhere an adhesive tape containing the marking code on the surface of the lithium battery. The marking code becomes the birth certificate of the battery. With the marking code belonging exclusively to each battery, all the production process of the battery is accessible.

The common structure of a traceable adhesive tape includes a base film with a marking code and an adhesive layer. The marking code formed on the surface of the base material is usually achieved by engraving, spraying, printing, and other methods. By adopting the engraving process to form the marking code on the surface of the substrate, the adhesive layer may only be applied thereto selectively, resulting in low engraving efficiency, high cost of production equipment, and great difficulty in achieving the engraving code of different colors. However, adopting the spraying or printing process to form the marking code on the surface of the substrate often suffers from the problem of insufficient adhesive force of the ink coating.

SUMMARY OF THE INVENTION

An object of the present application is to provide an identifiable substrate, an identifiable adhesive tape applying the same and a preparation method of the identifiable adhesive tape, so as to improve the structural stability of the identifiable adhesive tape.

According to an aspect of the present application, provided is an identifiable substrate, including a base film and a marking layer, the base film including an identifying surface, the marking layer is an ink coating, in which the marking layer is laminated with the identifying surface of the base film; a surface tension of the identifying surface is D1; a surface tension of the marking layer is D2; and a thickness of the marking layer H satisfies 0.8 μm≤H≤(D1/D2)×5 μm. Alternatively, "substrate layer" may be used to indicate the "base film" of the present solution, and "marking layer laminating surface" may be used to indicate the "identifying surface" of the "base film" of the present solution.

In the present solution, the relative surface tension of the base film and the marking layer reflects the surface effect of the lamination between the base film and the marking layer. A thickness range of the marking layer is determined based thereon, so that the ink load on the surface of the base film is effectively controlled within the threshold value of the base film. Therefore, in the identifiable substrate provided by the present application, the base film and the marking layer are firmly laminated, and there is no chance that the marking layer falls off from the surface of the base film. In the prior art, when improvement of ink adhesion on the surface of a substrate (base film) is required, attention is generally paid only to the roughness degree of the substrate. In the solution provided in the present application, the surface action condition of the ink coating and the substrate surface is simultaneously correlated with the ink loading amount, so that the marking layer solidified by the ink is stably adhered to the base film substrate, resulting in a stable product performance of the identifiable substrate having the structural properties mentioned above. In addition, the marking layer mentioned above is an ink coating that is sprayed or printed. Compared to an engraved marking, the marking is formed by the ink coating, which reduces the difficulty and cost of the process of forming the marking, and improves the efficiency of the process of forming the marking code.

Optionally, the marking layer includes, but is not limited to, a two-dimensional code and a bar code, in which two-dimensional codes may be selected from a QR code, a DM code, a visual code, a two-dimensional code +, a dot matrix with or without codes used to record information, and all computerized graphic codes that are computer information recordable, optically readable, and provide a visible effect.

D1 is not less than 35 dyn/cm, and D2 is not more than 35 dyn/cm. Preferably, a range of D1 is 35 dyn/cm≤D1≤60 dyn/cm, and a range of D2 is 25 dyn/cm≤D2≤35 dyn/cm. In the present solution, with D1>D2, the ink is able to spread on the base film, and the surface tension value of the identification surface and the marking layer respectively satisfy the above range of values, so that a sufficiently large adhesive base force is formed between the identification surface of the base film and the marking layer, which enables the base film and the marking layer to be firmly laminated.

Preferably, D1≥40 dyn/cm.

Preferably, 44 dyn/cm≤D1≤52 dyn/cm.

Optionally, the base film is at least one of a polyethylene terephthalate (PET) film, a polypropylene (PP) film, a polyimide (PI) film, and a biaxially oriented polypropylene (BOPP) film.

Preferably, the base film is a PET film. Compared to other materials, PET film offers a higher surface tension value, which provides a good surface for ink adhesion. Also, PET film offers the proper range of hardness, which in general results in it being the preferred substrate for the marking layer.

Preferably, the identifying surface is subjected to a corona treatment. Performing a corona treatment on base films, especially those made of PET, significantly improves the surface tension value of the identification surface of the base film and optimizes the adhesion effect of the ink on the identification surface of the base film.

Preferably, processing parameters of the corona treatment are as follows: a power of the corona treatment is 2-3 kw and a speed of the corona treatment is 40-60 m/min. The above process enables the surface tension value of PET film to reach 44 dyn/cm or more.

Preferably, the marking layer is an ink coating formed by polyester acrylate ink.

According to another aspect of the present application, provided is an identifiable adhesive tape, including an identifiable substrate mentioned above and an adhesive layer, the adhesive layer being laminated with the identifying surface of the identifiable substrate and the adhesive layer covering the marking layer. In the identifiable adhesive tape mentioned above, the adhesive layer covering the marking layer may provide a certain protective effect to the marking layer, preventing the marking layer from being peeled off from the base film.

Preferably, a thickness of the marking layer H≤3 μm.

Preferably, a thickness of the marking layer satisfies 1.7 μm≤H≤2 μm.

Based on that the surface of the marking layer is covered with the adhesive layer, if the marking layer is too thin, during the manufacturing process of applying glue to form the adhesive layer, the glue may significantly erode the marking layer when the glue is not dry. A too-thin marking layer covered by the adhesive layer results in poor color rendering, resulting in an inability to be clearly identified. If the marking layer is too thick, it is difficult for the adhesive layer to attach to both the surface of the base film and the surface of the marking layer when the formed adhesive layer is used for direct lamination with the base film. The base film is raised by the excessively thick marking layer, which creates a structural weakness in the adhesive tape and tends to introduce air bubbles between the substrate and the adhesive layer.

Preferably, an initial adhesion of the adhesive layer on a surface of the identifiable substrate is 4N/25 mm-6N/25 mm. Therefore, it is ensured that the adhesive layer is sufficiently bonded to the surface of the base film of the identifiable substrate and the surface of the marking layer simultaneously, so that there is no delamination of the adhesive tape.

According to another aspect of the present application, provided is a preparation method of an identifiable adhesive tape mentioned above, including following steps: step one: spraying or printing ink on the identifying surface of the base film; drying the ink to form the marking layer; obtaining the identifiable substrate; and step two: applying glue by a scraper on the identifying surface of the identifiable substrate; drying the glue to form the adhesive layer laminated with the identifying surface.

The identifying surface of the identifiable substrate mentioned above and the marking layer distributed on the identifying surface form collectively a concave-convex surface based on the thickness of the marking layer. In the case of the micro-concave transfer coating process (i.e., the glue is first quantitatively applied with a micro-concave roller to the corona surface of a release film, and then laminated on the same side with the substrate film that is dry and has been spray-dried), when using the formed adhesive film to laminate with the identifying surface, it appears that the adhesive tape with a marking layer is tight after rewinding, and without a marking layer is soft, resulting in the adhesive layer not being able to be tightly laminated with the identifiable substrate. However, the preparation method provided in the present invention adopts a scraper-applying process to form an adhesive layer on the identifying surface of the identifiable substrate mentioned above, and the scraper-applying may compensate for the applying by the scraper, so that the surfaces of the identifying surface and the marking layer are tightly filled with the glue used for the formation of the adhesive layer, and the glue is able to be tightly adhered to the identifiable substrate after drying and solidifying to form the adhesive layer.

Preferably, slitting the identifiable adhesive tape after the adhesive layer is formed to obtain a finished product.

According to another aspect of the present application, provided is an identifiable adhesive tape, including an identifiable substrate mentioned above and an adhesive layer; the opposite surface of the identifying surface of the identifiable substrate is used as the adhesive layer laminating surface of the identifiable substrate; and the adhesive layer is laminated to the adhesive layer laminating surface of the identifiable substrate. The identifiable adhesive tape provided in the present solution enables the marking layer and the adhesive layer to be provided on two surfaces of the base film respectively, which avoids the marking layer from being corroded by the adhesive, and avoids the clarity of the marking layer from being degraded due to the covering of the adhesive layer, and ensures that the marking layer may be accurately identified.

Preferably, a thickness of the marking layer is not more than 10 μm.

Preferably, a thickness of the marking layer is not less than 1.5 μm.

Preferably, a thickness of the marking layer is 1.7 μm-2 μm.

The thickness of the marking layer is managed to be within a certain range, which on the one hand satisfies that the overall identifiable adhesive tape remains thin and light and the energy density of the lithium battery is improved, and on the other hand avoids that the marking layer tends to detach from the laminating surface of the marking layer due to the overloading of the ink used to form the marking layer on the identifying surface.

Preferably, a surface of the adhesive layer and/or a surface of the adhesive layer are/is provided with a release layer. By providing a release layer, the release layer isolates the adhesive layer of the exterior adhesive tape from the marking layer of the interior adhesive tape when the identifiable adhesive tape is rewound, so that the identifiable adhesive tape is easily unwound, thereby avoiding a situation in which the adhesive layer of the exterior adhesive tape tears the marking layer of the interior adhesive tape to a certain extent during unwinding of the identifiable adhesive tape, which may result in damage to the marking layer of the interior adhesive tape.

Preferably, a release agent coating solidified from a release agent is formed on a surface of the marking layer, and the release agent coating is used as the release layer. The release agent is applied to the surface of the marking layer to form a release agent coating. On the one hand, the release agent coating enables the identifiable adhesive tape mentioned above to provide the property of being easily unwound, and on the other hand, no additional entire piece of release agent film is required, which not only saves the cost of consumables in the production of the adhesive tape, but also eliminates the necessity to peel off the release agent film to expose the adhesive layer before use, which simplifies the operation of the adhesive tape, and also enables the lithium battery marking adhesive tape to remain in the lightweight and thinness.

Preferably, the marking layer includes a plurality of marking units spaced apart, and the release layer is simultaneously attached to an outer surface of the marking unit and to the identifying surface.

Preferably, the marking layer includes a plurality of marking units spaced apart; a spacing area between adjacent marking units and a surface of the marking unit are all provided with the release agent coating formed by the release agent; and the release agent coating is used as the release layer.

Preferably, the release agent is a non-silicon-based release agent.

Preferably, the non-silicon-based release agent is a release agent of a poly(vinyl N-octadecylcarbamate) type. The release agent of a poly(vinyl N-octadecylcarbamate) type provides a good spreading effect on the surface of the marking layer formed by the polyester acrylate ink, and the adhesive layer thus formed on the surface of the marking layer is uniform and clear.

Preferably, a thickness of the release layer is not more than 1 μm. Firstly, it ensures that the marking layer is clearly identifiable. Secondly, it enables the identifiable adhesive tape to remain light and thin, and the energy density of the lithium battery applying the identifiable adhesive tape is improved. Thirdly, the amount of glue is saved, and the saving of glue correspondingly reduces the forming time of the adhesive layer, which improves the production efficiency of the identifiable adhesive tape.

According to another aspect of the present application, provided is a preparation method of an identifiable adhesive tape mentioned above, including following steps: step one: spraying or printing ink on the identifying surface of the base film; drying the ink to form the marking layer; obtaining the identifiable substrate; step two: applying glue on the adhesive layer laminating surface of the base film; drying and solidifying the glue to form the adhesive layer; obtaining a first semi-finished product; and step three: curing the first semi-finished product at a temperature not lower than 45° C.

Preferably, laminating a release film on a surface of the adhesive layer after the adhesive layer is formed in step two.

Preferably, applying a release agent on a surface of the marking layer and drying the release agent to form a release agent coating on a surface of the marking layer after step one is finished.

Preferably, the preparation method further includes a step four: slitting the first semi-finished product after curing treatment to obtain a desired length and width to prepare a finished product.

According to another aspect of the present application, provided is a preparation method of an identifiable adhesive tape mentioned above, including following steps: step one: applying glue on the adhesive layer laminating surface of the base film; drying and solidifying the glue to form the adhesive layer; obtaining a first semi-finished product; step two: curing the first semi-finished product at a temperature not lower than 45° C. to obtain a second semi-finished product; and step three: spraying or printing ink on the identifying surface of the base film; drying the ink to form the marking layer.

Preferably, laminating a release film on a surface of the adhesive layer after the adhesive layer is formed in step one.

Preferably, the preparation method further includes a step four: slitting a product prepared by step three to obtain a desired length and width to prepare a finished product.

BRIEF DESCRIPTION OF THE DRAWINGS

In the drawings mentioned above, the correspondence of the attached markings is as follows: 1 marking layer; 2 base film; 3 adhesive layer; 4-1 release film; 4-2 release agent coating.

DETAILED DESCRIPTION OF THE PREFERRED EXAMPLES

For a better understanding of the solutions of the present application by those skilled in the art, the technical solutions in the examples of the present application are clearly and completely described and discussed below. Obviously, the examples described herein are only some of the examples of the present application but not all of them.

The ink used to form the marking layer 1 in the following examples and the contrast example is an electrolyte-resistant ink which meets the requirements of humidity resistance (60% RH*2H), high temperature resistance (130° C.*2H), solvent resistance (toluene, ethyl ester), and electrolyte resistance.

Example 1

Figure 1:
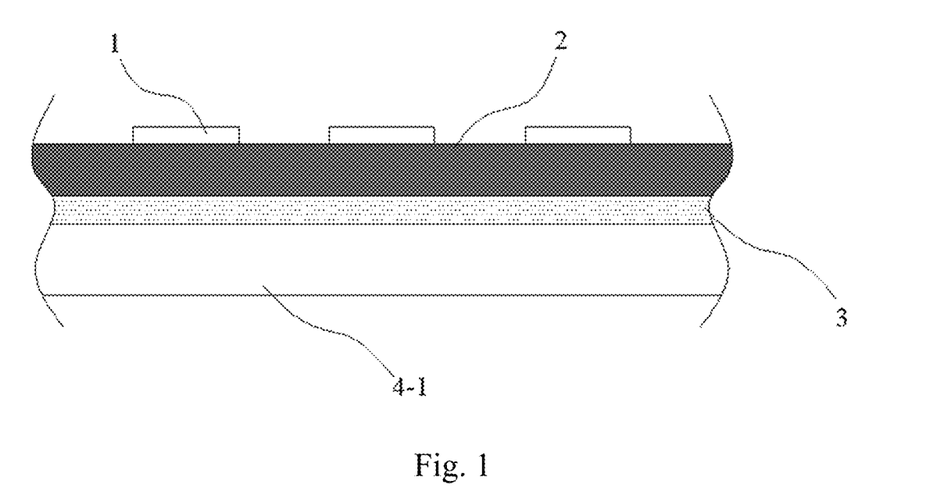
FIG. 1 is a structural diagram of layers of the identifiable adhesive tape in example 1, example 2, processing groups C1-C6 of example 3 and processing groups E1-E9 of example 4.

In the present example, a transparent 19 μm PET film is used as the base film 2, and the surface dyne level of the base film 2 is adjusted by corona treatment of the base film 2. A polyester acrylate ink is used as the ink for forming the marking layer 1. The polyester acrylate ink is a UV ink, a mixture containing a high-functionality monomer, and a low-functionality monomer, and the ratio of the high-functionality monomer and the low-functionality monomer in the ink is adjusted to regulate the dyne level 1 of the marking layer formed by the ink. The information such as two-dimensional code is sprayed on the identifying surface of the base film 2 by the code spraying equipment, and the marking layer 1 is formed by drying to obtain the identifiable substrate. The transparent acrylic/rubber glue is then applied to the reverse side of the printed two-dimensional code on the identifiable substrate by micro-concave coating. It is oven-dried and solidified at 100° C. to form an adhesive layer 3 on the surface of the base film 2. The dried adhesive layer 3 with a thickness of 11 μm is laminated to the release film 4-1. The release film 4-1 of the present example is a 25 μm PET release film, and a first semi-finished product is prepared. The first semi-finished product is placed in an environment of 50° C. for 48 hours to prepare a second semi-finished product. The second semi-finished product is slit to obtain the desired length and width thereof and the finished product of the release film 4-1 is retained, in which the structure of layers of the finished product is shown in FIG. 1.

In the present example, different processing groups are set by adjusting the dyne level of the identifying surface of the base film 2 of the identifiable substrate of the identifiable adhesive tape, the dyne level of the marking layer 1, and the thickness of the marking layer 1, in which the detailed settings of the processing groups are shown in Table 1.

TABLE 1

Parametric indicators of the identifiable substrate applied to each processing group in Example 1

| Processing Groups | Dyne level D1 of the identifying surface of the base film/(dyn/cm) | Dyne level D2 of the marking layer/(dyn/cm) | (D1/D2) × 5/(μm) | Thickness of the marking layer H/(μm) |
|---|---|---|---|---|
| Processing Group A1 | 60 | 30 | 10 | 8 |
| Processing Group A2 | 45 | 35 | 5.7 | 5.5 |
| Processing Group A3 | 40 | 25 | 8 | 9 |
| Processing Group A4 | 40 | 25 | 8 | 7 |
| Processing Group A5 | 35 | 30 | 5.8 | 6 |
| Processing Group A6 | 35 | 34 | 5.15 | 5.5 |
| Processing Group A7 | 35 | 34 | 5.15 | 5 |
| Processing Group A8 | 32 | 30 | 5.33 | 5 |
| Processing Group A9 | 30 | 27 | 5.56 | 5.5 |

Testing Item:

Testing Objects: Identifiable adhesive tapes prepared by Processing Groups A1-A9. 50 replicates are set up for each testing object.

Testing Item 1: Attaching the testing object to the surface of an aluminum-plastic film; then attaching a release film 4-1 to the surface of the marking layer 1; then tearing off the release film 4-1; observing whether there is any ink loss on the marking layer 1; counting the number of samples of adhesive tapes on the marking layer 1 with ink loss; and indicating the percentage of the number of samples of adhesive tapes on the marking layer 1 with ink loss in the total number of tested products in the same group by the ink loss rate of the marking layer 1.

Testing Item 2: Attaching the testing object to the surface of an aluminum-plastic film; then attaching a low viscosity cover film to the surface of the marking layer 1; then tearing off the low viscosity cover film; observing whether there is any ink loss on the marking layer 1; counting the number of samples of adhesive tapes on the marking layer 1 with ink loss; and indicating the percentage of the number of samples of adhesive tapes on the marking layer 1 with ink loss in the total number of tested products in the same group by the ink loss rate of the marking layer 1.

Testing Results: The testing results of the present example are shown in Table 2. Based on whether the tested sample satisfies $0.8\ \mu m \leq H \leq (D1/D2) \times 5\ \mu m$, among the processing groups set up in the present example, the identifiable adhesive tapes prepared by Processing Group A3, Processing Group A5, and Processing Group A6 do not satisfy the above conditions. During the adhesion performance test, the identifiable adhesive tapes prepared by the above three processing groups suffer from different degrees of ink loss in both testing item 1 and testing item 2. Therefore, it is shown that the lamination effect between the marking layer 1 and the base film 2 of the identifiable adhesive tapes prepared by the processing groups is poor. However, the tested samples prepared by Processing Group A1, Processing Group A2, Processing Group A4, Processing Group A7, Processing Group A8, and Processing Group A9, do not suffer from ink loss in testing item 1, indicating that excellent lamination effects are achieved by both the marking layer 1 and the base film 2 in the adhesive tapes prepared by these processing groups. Compared to testing item 1, the tear strength of testing item 2 is greater for the marking layer 1 of the tested samples. In testing item 2, most of the processing groups suffer from different degrees of ink loss. However, there is still no ink loss of the tested samples in Processing Group A1 and Processing Group A2, which indicates that the base film 2 and the marking layer 1 in the identifiable adhesive tape prepared by these two processing groups are firmly laminated, and that the marking layer 1 shows excellent adhesion on the surface of the base film 2. In terms of summarizing the testing results of the present example and the processing difficulty and cost of the substrate, under the premise of satisfying $0.8\ \mu m \leq H \leq (D1/D2) \times 5\ \mu m$, if the dyne level D1 of the identifying surface of the base film 2 satisfies $44\ dyn/cm \leq D1 \leq 52\ dyn/cm$, and the dyne level D2 of the marking layer 1 satisfies $30\ dyn/cm \leq D1 \leq 35\ dyn/cm$, the lamination effect of the base film 2 and the marking layer 1 is better.

TABLE 2

Adhesion performance test results of the marking layer 1

| | Ink loss rate of the marking layer | |
|---|---|---|
| Processing Groups | Testing Item 1 | Testing Item 2 |
| Processing Group A1 | 0% | 0% |
| Processing Group A2 | 0% | 0% |
| Processing Group A3 | 4% | 18% |
| Processing Group A4 | 0% | 2% |
| Processing Group A5 | 6% | 20% |
| Processing Group A6 | 16% | 28% |
| Processing Group A7 | 0% | 12% |
| Processing Group A8 | 0% | 8% |
| Processing Group A9 | 0% | 2% |

Example 2

A thickness of the base film 2 adopted in the present example is 19 μm, and the base film 2 is subjected to a double-sided corona treatment. The information such as two-dimensional code is sprayed on any surface of the base film 2 by the code spraying equipment, and a thickness of 6 μm of the marking layer 1 with its surface dyne level of 30 dyn/cm is formed by drying to obtain the identifiable substrate. The transparent acrylic/rubber glue is then applied to the reverse side of the printed two-dimensional code on the identifiable substrate by micro-concave coating. It is oven-dried and solidified at 100° C. to form an adhesive layer 3 on the surface of the base film 2. The dried adhesive layer 3 with a thickness of 11 μm is laminated to the release film 4-1. The release film 4-1 of the present example is a 25 μm PET release film, and a first semi-finished product is prepared. The first semi-finished product is placed in an environment of 50° C. for 48 hours to prepare a second semi-finished product. The second semi-finished product is slit to obtain the desired length and width thereof and the finished product of the release film 4-1 is retained, in which the structure of layers of the finished product is shown in FIG. 1.

In the present example, the material of the base film 2 is used as a variable to set up different processing groups. In each processing group, the base film 2 is subjected to double-sided corona treatment to improve the surface dyne level of the base film 2. The processing parameters of the corona treatment are as follows: the corona power is 2-3 kw, and the speed of the corona treatment is 40-60 m/min. The material of the base film 2 adopted in each processing group of the present example and the surface dyne level of the base film 2 after corona treatment are shown in Table 3.

Testing Item: Attaching the testing object to the surface of an aluminum-plastic film; then attaching a release film 4-1 to the surface of the marking layer 1; then tearing off the release film 4-1; observing whether there is any ink loss on the marking layer 1; counting the number of samples of adhesive tapes on the marking layer 1 with ink loss; and indicating the percentage of the number of samples of adhesive tapes on the marking layer 1 with ink loss in the total number of tested products in the same group by the ink loss rate of the marking layer 1.

Testing Results: As shown in Table 3. Among the different materials of the tested adhesive films, the surface dyne level of the PET film is significantly increased after corona treatment, and the base film 2, which is used as an identifiable substrate, enables the marking layer 1 and the base film 2 to be firmly laminated with each other.

TABLE 3

Setting of the processing group of the present example and adhesion performance test results of the marking layer 1

| Processing Groups | Processing Group B1 | Processing Group B2 | Processing Group B3 | Processing Group B4 |
|---|---|---|---|---|
| Materials of the adhesive film | PET film | PP film | PI film | BOPP film |
| Surface dyne level after corona treatment | 44 dyn/cm | 40 dyn/cm | 35 dyn/cm | 38 dyn/cm |
| Ink loss rate of the marking layer | 0% | 0% | 4% | 0% |

Example 3

Processing Group C1

In the present processing group, a transparent 19 μm PET double-sided corona film is used as the base film 2, and the surface dyne level of the base film 2 is 44 dyn/cm. The information such as two-dimensional code is sprayed on the identifying surface of the base film 2 by the code spraying equipment, and the marking layer 1 is formed by drying to obtain the identifiable substrate. The blue acrylic/rubber glue is then applied to the reverse side of the printed two-dimensional code on the identifiable substrate by micro-concave coating, in which the pigment used in the blue acrylic/rubber glue is an organic pigment. It is oven-dried and solidified at 100° C. to form an adhesive layer 3 on the surface of the base film 2. The dried adhesive layer 3 with a thickness of 11 μm is laminated to the release film 4-1. The release film 4-1 of the present example is a 25 μm PET release film, and a first semi-finished product is prepared. The first semi-finished product is placed in an environment of 50° C. for 48 hours to prepare a second semi-finished product. The second semi-finished product is slit to obtain the desired length and width thereof and the finished product of the release film 4-1 is retained, in which the structure of layers of the finished product is shown in FIG. 1.

Processing Group C2

The difference between the present processing group and processing group C1 is that the pigment used in the blue acrylic/rubber glue adopted in processing group C1 is replaced with an inorganic pigment, and the release film 4-1 is a 12 μm PET release film, in which the structure of layers of the finished product is shown in FIG. 1.

Processing Group C3

The difference between the present processing group and processing group C1 is that the blue acrylic/rubber glue adopted in processing group C1 is replaced with the green acrylic/rubber glue, and the release film 4-1 is a 12 μm PET release film, in which the structure of layers of the finished product is shown in FIG. 1.

Processing Group C4

The difference between the present processing group and processing group C1 is that the blue acrylic/rubber glue adopted in processing group C1 is replaced with the transparent acrylic/rubber glue, and the release film 4-1 is a 12 μm PET release film, in which the structure of layers of the finished product is shown in FIG. 1.

Processing Group C5

In the present processing group, a transparent 19 μm PET double-sided corona film is used as the base film 2. The blue acrylic/rubber glue is then applied to any surface of the base film 2 by micro-concave coating, in which the pigment used in the blue acrylic/rubber glue is an organic pigment. It is oven-dried and solidified at 100° C. to form an adhesive layer 3 on the surface of the base film 2. The dried adhesive layer 3 with a thickness of 11 μm is laminated to the release film 4-1. The release film 4-1 of the present example is a 25 μm PET release film, and a first semi-finished product is prepared. The first semi-finished product is placed in an environment of 50° C. for 48 hours to prepare a second semi-finished product. The second semi-finished product is placed on a non-standard customized slitting equipment. The entire width of information such as two-dimensional code is sprayed by a plurality of side-by-side code spraying equipments working synchronously to form a marking layer 1 on the other side of the laminating surface between the base film 2 and the adhesive layer 3. The desired length and width are later obtained by the slitting function of a slitting machine, and the finished product of the release film 4-1 is retained, in which the structure of layers of the finished product is shown in FIG. 1.

Processing Group C6

The difference between the present processing group and processing group C5 is that the blue acrylic/rubber glue adopted in processing group C5 is replaced with the green acrylic/rubber glue, and the release film 4-1 is a 12 μm PET release film, in which the structure of layers of the finished product is shown in FIG. 1.

Processing Group C7

Figure 2:
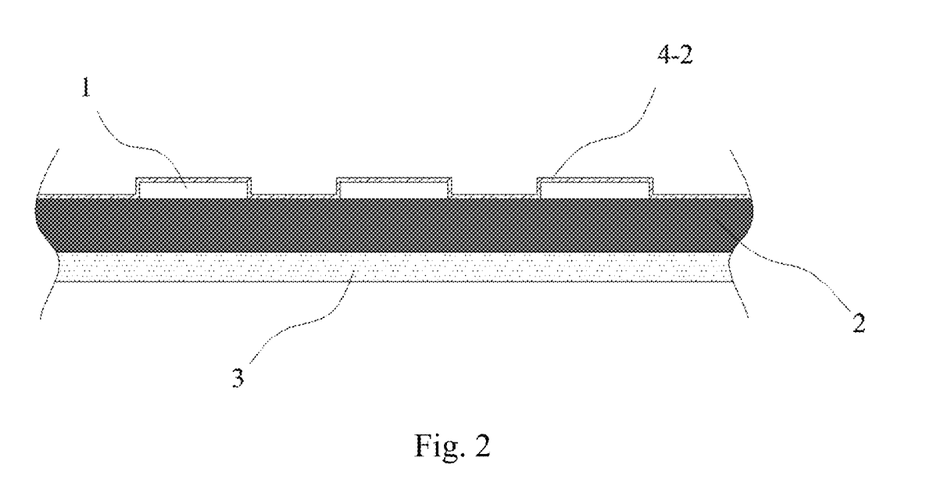
FIG. 2 is a structural diagram of layers of the identifiable adhesive tape in processing group C7 of example 3.

In the present processing group, a transparent 19 μm PET double-sided corona film is used as the base film 2, and the surface dyne level of the base film 2 is 44 dyn/cm. The two-dimensional code is sprayed on any corona surface of the 1 m wide base film 2 by the code spraying equipment. After drying, a marking layer 1 is formed, and an identifiable substrate is prepared. As shown in FIG. 2, the marking layer 1 consists of a plurality of two-dimensional codes spaced apart. The release agent is applied on the code spraying surface of the identifiable substrate, so that the release agent fills the gap between adjacent two-dimensional codes. The release layer is applied with a thickness of 5 μm, which completely covers the marking layer 1. The release agent is dried and only the formed release agent coating 4-2 is left with a thickness of 0.5 μm. However, the exterior surface of the marking layer 1 is also covered with a 0.5 μm release coating formed by the release agent after drying the release agent to produce the first semi-finished product. The blue acrylic/rubber glue is then applied to the adhesive layer laminating surface of the base film 2 of the first semi-finished product by micro-concave coating, in which the pigment used in the blue acrylic/rubber glue is an organic pigment. It is oven-dried and solidified at 100° C. to form an adhesive layer 3 on the surface of the base film 2. The dried adhesive layer 3 with a thickness of 11 μm is placed in an environment of 50° C. for 48 hours to prepare a second semi-finished product. The second semi-finished product is slit on a non-standard customized slitting equipment to obtain a finished product of the desired length and width.

Processing Group C8

Figure 3:
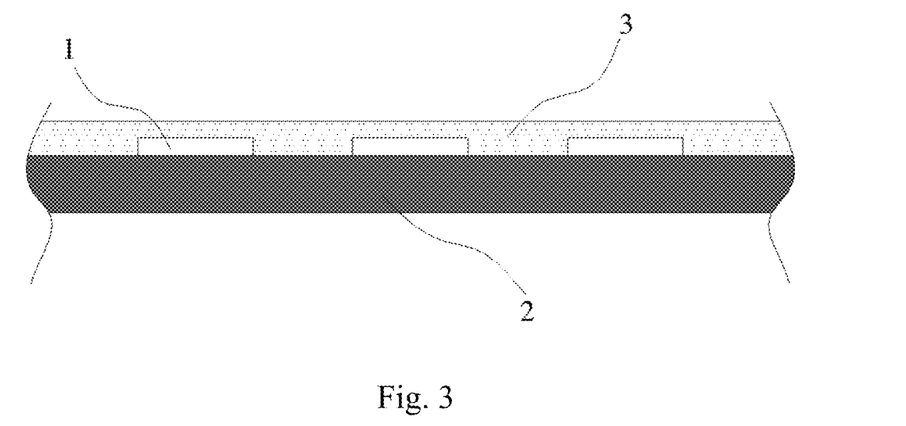
FIG. 3 is a structural diagram of layers of the identifiable adhesive tape in processing group C8 of example 3.

In the present processing group, a transparent 19 μm PET double-sided corona film is used as the base film 2, and the surface dyne level of the base film 2 is 44 dyn/cm. The two-dimensional code is sprayed on any corona surface of the 1 m wide base film 2 by the code spraying equipment. After drying, a marking layer 1 is formed, and an identifiable substrate is prepared. As shown in FIG. 3, the marking layer 1 consists of a plurality of two-dimensional codes spaced apart. The blue acrylic/rubber glue is then applied to the same side of the printed two-dimensional code on the identifiable substrate by scraper coating, in which the pigment used in the blue acrylic/rubber glue is an organic pigment. It is oven-dried and solidified at 100° C. to form an adhesive layer 3 on the surface of the base film 2. The dried adhesive layer 3 with a thickness of 11 μm is placed in an environment of 50° C. for 48 hours to prepare a second semi-finished product. The second semi-finished product is slit on a non-standard customized slitting equipment to obtain a finished product of the desired length and width.

Control Processing Group

The blue acrylic/rubber glue is applied to the corona surface of the 19 μm PET release film by micro-concave coating, in which the pigment used in the blue acrylic/rubber glue is an organic pigment. It is oven-dried and solidified at 100° C. to form an adhesive layer 3. The oven-dried adhesive layer 3 with a thickness of 11 μm is laminated to the 25 μm PET release film, and a first semi-finished product is prepared. The first semi-finished product is placed in an environment of 50° C. for 48 hours to prepare a second semi-finished product. A third semi-finished product of fixed length and width is obtained by rewinding and slitting the second semi-finished product. The third semi-finished product is rewound by laser coding on the adhesive surface to obtain a finished product with information icons such as two-dimensional codes.

Testing Objects: Identifiable adhesive tapes prepared by Processing Groups C1-C8. 50 replicates are set up for each testing object.

Testing Item I

Scan the two-dimensional code on the adhesive tape with the SR-1000 code scanning gun. If the scanned two-dimensional code displays relevant information, it is OK, otherwise it is NG.

Testing Objects: Identifiable adhesive tapes prepared by Processing Groups C1-C8. 50 replicates are set up for each testing object.

Testing Item II

Scan the two-dimensional code on the adhesive tape with the SR-750 code scanning gun. If the scanned two-dimensional code displays relevant information, it is OK, otherwise it is NG.

Testing Objects: Identifiable adhesive tapes prepared by Processing Groups C1-C8. 50 replicates are set up for each testing object.

Testing Results: The testing results are shown in Table 4. In testing item I, after scanning with the SR-1000 scanning gun, only the adhesive tape provided by the Control Processing Group fails to achieve 100% identification of the two-dimensional code; in testing item II, after scanning with the SR-750 scanning gun, only the adhesive tape provided by the Processing Group C8 and Control Processing Group fails to achieve 100% identification of the two-dimensional code.

TABLE 4

Identification of two-dimensional codes for the identifiable adhesive tapes for each processing group of the present example

| Processing Groups | Testing Item I Two-dimensional code identification rate | Testing Item II Two-dimensional code identification rate |
| --- | --- | --- |
| Processing Group C1 | 100% | 100% |
| Processing Group C2 | 100% | 100% |
| Processing Group C3 | 100% | 100% |
| Processing Group C4 | 100% | 100% |
| Processing Group C5 | 100% | 100% |
| Processing Group C6 | 100% | 100% |
| Processing Group C7 | 100% | 100% |
| Processing Group C8 | 100% | 80% |
| Control Processing Group | 94% | 60% |

Testing Item III

Figure 4:
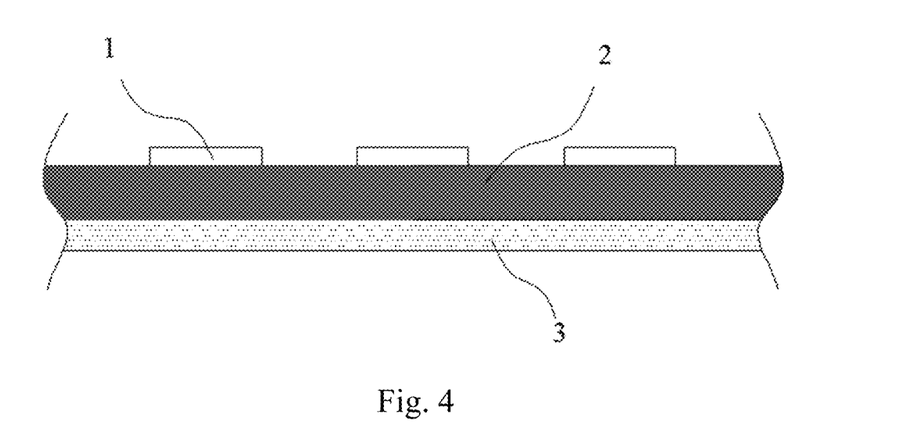
FIG. 4 is a structural diagram of layers of the tested adhesive tape D3 and tested adhesive tape D4 in example 3.

Testing object:

(1) Finished adhesive tape prepared by Processing Group C1, labeled as tested adhesive tape D1;

(2) Referring to the solution documented in Processing Group C1, the step of attaching 25 μm PET release film 4-1 is omitted. The rest of the steps are operated consistently with that of Processing Group C1, and the resulting finished adhesive tape, in which the structure of layers of the finished product is shown in FIG. 4, is labeled as the tested adhesive tape D2;

(3) Finished adhesive tape prepared by Processing Group C7, labeled as tested adhesive tape D3;

(4) Referring to the solution documented in Processing Group C7, the step of applying release agent is omitted. The rest of the steps are operated consistently with that of Processing Group C7, and the resulting finished adhesive tape, in which the structure of layers of the finished product is shown in FIG. 4, is labeled as the tested adhesive tape D4;

Testing Item:

Performing low-speed unwinding strength testing in reference to GB/T4850.

Testing Results: The testing results of the present testing example are shown in Table 5. It is proved by the experiment results that the finished adhesive tapes produced by Processing Group C1 and Processing Group C7 perform less low-speed unwinding force, and may realize convenient and easy unwinding in the industrialized production.

TABLE 5

Expansion adhesive tape low-speed unwind strength test

| Testing object | Low-speed unwinding force (N/mm) |
| --- | --- |
| Tested Adhesive Tape D1 | 0.003 |
| Tested Adhesive Tape D2 | 0.11 |
| Tested Adhesive Tape D3 | 0.002 |
| Tested Adhesive Tape D4 | 0.09 |

Example 4

The present example sets up nine processing groups (labeled as Processing Group E1, Processing Group E2, Processing Group E3, Processing Group E4, Processing Group E5, Processing Group E6, Processing Group E7, Processing Group E8, and Processing Group E9, respectively) as well as one control group (labeled as Control Processing Group F1) for the preparation of the identifiable adhesive tape, and the detailed setup method is as follows:

Processing Group E1

A transparent 19 μm PET double-sided corona film is used as the base film 2, and the surface dyne level of the base film 2 is 35 dyn/cm. The information such as two-dimensional code is sprayed on the identifying surface of the base film 2 by the code spraying equipment, and the marking layer 1 is formed by drying to obtain the identifiable substrate. The blue acrylic/rubber glue is then applied to the reverse side of the printed two-dimensional code on the identifiable substrate by micro-concave coating, in which the pigment used in the blue acrylic/rubber glue is an organic pigment. It is oven-dried and solidified at 100° C. to form an adhesive layer 3 on the surface of the base film 2. The dried adhesive layer 3 with a thickness of 11 μm is laminated to the release film 4-1. The release film 4-1 of the present example is a 25 μm PET release film, and a first semi-finished product is prepared. The first semi-finished product is placed in an environment of 50° C. for 48 hours to prepare a second semi-finished product. The second semi-finished product is slit to obtain the desired length and width thereof and the finished product of the release film 4-1 is retained, in which the structure of layers of the finished product is shown in FIG. 1.

Processing Group E2

The difference between the present processing group and processing group E1 is that a surface dyne level of the base film 2 is 40 dyn/cm, in which the structure of layers of the finished product is shown in FIG. 1.

Processing Group E3

The difference between the present processing group and processing group E1 is that a surface dyne level of the base film 2 is 45 dyn/cm, in which the structure of layers of the finished product is shown in FIG. 1.

Processing Group E4

The difference between the present processing group and processing group E1 is that a surface dyne level of the base film 2 is 50 dyn/cm, in which the structure of layers of the finished product is shown in FIG. 1.

Processing Group E5

The difference between the present processing group and processing group E1 is that the pigment used in the blue acrylic/rubber glue adopted in processing group E1 is replaced with an inorganic pigment, and the release film 4-1 is a 12 μm PET release film, in which the structure of layers of the finished product is shown in FIG. 1.

Processing Group E6

The difference between the present processing group and processing group E1 is that the blue acrylic/rubber glue adopted in processing group E1 is replaced with the green acrylic/rubber glue, and the release film 4-1 is a 12 μm PET release film, in which the structure of layers of the finished product is shown in FIG. 1.

Processing Group E7

The difference between the present processing group and processing group E1 is that the blue acrylic/rubber glue adopted in processing group E1 is replaced with the transparent acrylic/rubber glue, and the release film 4-1 is a 12 μm PET release film, in which the structure of layers of the finished product is shown in FIG. 1.

Processing Group E8

In the present processing group, a transparent 19 μm PET double-sided corona film is used as the base film 2, and the surface dyne level of the base film 2 is 35 dyn/cm. The blue acrylic/rubber glue is then applied to any surface of the base film 2 by micro-concave coating, in which the pigment used in the blue acrylic/rubber glue is an organic pigment. It is oven-dried and solidified at 100° C. to form an adhesive layer 3 on the surface of the base film 2. The dried adhesive layer 3 with a thickness of 11 μm is laminated to the release film 4-1. The release film 4-1 of the present example is a 25 μm PET release film, and a first semi-finished product is prepared. The first semi-finished product is placed in an environment of 50° C. for 48 hours to prepare a second semi-finished product. The second semi-finished product is placed on a non-standard customized slitting equipment. The entire width of information such as two-dimensional code is sprayed by a plurality of side-by-side code spraying equipments working synchronously to form a marking layer 1 on the other side of the laminating surface between the base film 2 and the adhesive layer 3, in which the surface dyne level of the marking layer 1 is 30 dyn/cm, and a thickness thereof is 5 μm. The desired length and width are later obtained by the slitting function of a slitting machine, and the finished product of the release film 4-1 is retained, in which the structure of layers of the finished product is shown in FIG. 1.

Processing Group E9

The difference between the present processing group and processing group E5 is that the blue acrylic/rubber glue adopted in processing group E5 is replaced with the green acrylic/rubber glue, and the release film 4-1 is a 12 μm PET release film, in which the structure of layers of the finished product is shown in FIG. 1.

Control Processing Group F1

The blue acrylic/rubber glue is applied to the corona surface of the 19 μm PET release film 4-1 by micro-concave coating, in which the pigment used in the blue acrylic/rubber glue is an organic pigment. It is oven-dried and solidified at 100° C. to form an adhesive layer 3. The oven-dried adhesive layer 3 with a thickness of 11 μm is laminated to the 25 μm PET release film 4-1, and a first semi-finished product is prepared. The first semi-finished product is placed in an environment of 50° C. for 48 hours to prepare a second semi-finished product. A third semi-finished product of fixed length and width is obtained by rewinding and slitting the second semi-finished product. The third semi-finished product is rewound by laser coding on the adhesive surface to obtain a finished product with information icons such as two-dimensional codes.

The relevant product parameters of the identifiable adhesive tapes prepared by the processing groups as constructed in the present embodiment are listed in Table 6. By comparison, H, D1, and D2 of the identifiable adhesive tapes prepared in Processing Groups E1-E9 of the present example satisfy the quantitative relationship of 0.8 μm≤H≤(D1/D2)×5 μm, and the surface dyne level of the base film reaches 35 dyn/cm or more.

TABLE 6

Parametric indicators of the identifiable substrate applied to each processing group in Example 4

| Processing Groups | Dyne level D1 of the identifying surface of the base film/(dyn/cm) | Dyne level D2 of the marking layer/(dyn/cm) | (D1/D2) × 5/(μm) | Thickness of the marking layer H/(μm) |
|---|---|---|---|---|
| Processing Group E1 | 35 | 30 | 5.8 | 5 |
| Processing Group E2 | 40 | 30 | 6.7 | 5 |
| Processing Group E3 | 45 | 30 | 7.5 | 5 |
| Processing Group E4 | 50 | 30 | 8.3 | 5 |
| Processing Group E5 | 35 | 30 | 5.8 | 5 |
| Processing Group E6 | 35 | 30 | 5.8 | 5 |
| Processing Group E7 | 35 | 30 | 5.8 | 5 |
| Processing Group E8 | 35 | 30 | 5.8 | 5 |
| Processing Group E9 | 35 | 30 | 5.8 | 5 |

Testing Item I

Testing Objects: Identifiable adhesive tapes prepared by Processing Groups E1-E4. 50 replicates are set up for each testing object.

Testing Details: Attaching the testing object to the surface of an aluminum-plastic film; then attaching the release film to the surface of the marking layer; then tearing off the release film; observing whether there is any ink loss on the marking layer 1; counting the number of samples of adhesive tapes on the marking layer 1 with ink loss; and indicating the percentage of the number of samples of adhesive tapes on the marking layer 1 with ink loss in the total number of tested products in the same group by the ink loss rate of the marking layer 1.

Testing Result

The testing results of the testing item I of the present example are shown in Table 7, in which the identifiable adhesive tapes prepared by the Processing Groups E1-E4 do not suffer from ink loss of the marking layer 1, and the base film of the identifiable adhesive tapes is able to be firmly laminated with the marking layer 1.

TABLE 7

Ink losses of the marking layer after tearing off the release film

| Groups | Processing Group E1 | Processing Group E2 | Processing Group E3 | Processing Group E4 |
|---|---|---|---|---|
| Ink loss rate of the marking layer | 0% | 0% | 0% | 0% |

Testing Item II

Testing Objects: Identifiable adhesive tapes prepared by Processing Group E1, Processing Groups E5-E9, and Identifiable adhesive tapes prepared by Control Processing Group F1. 50 replicates are set up for each testing object.

Testing Details:

(1) Scan the two-dimensional code on the adhesive tape with the SR-1000 code scanning gun. If the scanned two-dimensional code displays relevant information, it is OK, otherwise it is NG.

(2) Scan the two-dimensional code on the adhesive tape with the SR-750 code scanning gun. If the scanned two-dimensional code displays relevant information, it is OK, otherwise it is NG.

Testing Results:

The testing results of the testing item II are shown in Tables 8 and 9. Among the tested adhesive tapes, after scanning with the SR-1000 scanning gun, only the adhesive tape provided by the Control Processing Group F1 fails to achieve 100% identification of the two-dimensional code; after scanning with the SR-750 scanning gun, only the adhesive tape provided by the Control Processing Group F1 fails to achieve 100% identification of the two-dimensional code.

TABLE 8

Scanning results scanned by the SR-1000 scanning gun

| Groups | Processing Group E1 | Processing Group E5 | Processing Group E6 | Processing Group E7 | Processing Group E8 | Processing Group E9 | Control Processing Group F1 |
|---|---|---|---|---|---|---|---|
| QR code recognition rate | 100% | 100% | 100% | 100% | 100% | 100% | 94% |

TABLE 9

Scanning results scanned by the SR-750 scanning gun

| Groups | Processing Group E1 | Processing Group E5 | Processing Group E6 | Processing Group E7 | Processing Group E8 | Processing Group E9 | Control Processing Group F1 |
|---|---|---|---|---|---|---|---|
| QR code recognition rate | 100% | 100% | 100% | 100% | 100% | 100% | 60% |

The above examples are only used to illustrate the technical solution of the present application rather than to limit the protection scope of the present application. Although the present application has been described in detail with reference to the above preferable examples, a person of ordinary skill in the art should be aware that modifications or equivalent substitutions may be carried out to the technical solution of the present application without departing from the essence and scope of the technical solutions of the present application.

The invention claimed is:

1. An identifiable substrate, characterized in that the identifiable substrate comprises a base film and a marking layer, the base film comprising an identifying surface, the marking layer is an ink coating, wherein the marking layer is laminated with the identifying surface of the base film;
   a surface tension of the identifying surface is D1; a surface tension of the marking layer is D2; and a thickness of the marking layer H satisfies 0.8 µm≤H≤ (D1/D2)×5 µm.

2. The identifiable substrate according to claim 1, characterized in that a range of D1 is 35 dyn/cm≤D1≤60 dyn/cm, and a range of D2 is 25 dyn/cm≤D2<35 dyn/cm.

3. The identifiable substrate according to claim 2, characterized in that D1≥44 dyn/cm.

4. The identifiable substrate according to claim 1, characterized in that the base film is at least one of a polyethylene terephthalate film, a polypropylene film, a polyimide film, and a biaxially oriented polypropylene film.

5. The identifiable substrate according to claim 1, characterized in that the base film is a PET film.

6. The identifiable substrate according to claim 5, characterized in that the identifying surface is subjected to a corona treatment.

7. The identifiable substrate according to claim 6, characterized in that processing parameters of the corona treatment are as follows: a power of the corona treatment is 2-3 kw and a speed of the corona treatment is 40-60 m/min.

8. The identifiable substrate according to claim 1, characterized in that the marking layer is an ink coating formed by polyester acrylate ink.

9. An identifiable adhesive tape, characterized by comprising an identifiable substrate as claimed in claim 1 and an adhesive layer, the adhesive layer being laminated with the identifying surface of the identifiable substrate and the adhesive layer covering the marking layer.

10. The identifiable adhesive tape according to claim 9, characterized in that a thickness of the marking layer H≤3 µm.

11. The identifiable adhesive tape according to claim 10, characterized in that an initial adhesion of the adhesive layer on a surface of the identifiable substrate is 4N/25 mm-6N/25 mm.

12. An identifiable adhesive tape, characterized by comprising an identifiable substrate as claimed in claim 1 and an adhesive layer; an opposite surface of the identifying surface of the identifiable substrate is used as an adhesive layer laminating surface of the identifiable substrate; and the adhesive layer is laminated to the adhesive layer laminating surface of the identifiable substrate.

13. The identifiable adhesive tape according to claim 12, characterized in that a thickness of the marking layer is not more than 10 µm.

14. The identifiable adhesive tape according to claim 13, characterized in that a thickness of the marking layer is 1.7 µm-2 µm.

15. The identifiable adhesive tape according to claim 12, characterized in that a surface of the adhesive layer and/or a surface of the adhesive layer are/is provided with a release layer.

16. The identifiable adhesive tape according to claim 15, characterized in that a release agent coating solidified from a release agent is formed on a surface of the marking layer, and the release agent coating is used as the release layer.

17. The identifiable adhesive tape according to claim 16, characterized in that the marking layer comprises a plurality of marking units spaced apart, and the release layer is simultaneously attached to an outer surface of the marking unit and to the identifying surface.

18. The identifiable adhesive tape according to claim 16, characterized in that the marking layer comprises a plurality of marking units spaced apart; a spacing area between adjacent marking units and a surface of the marking unit are all provided with the release agent coating formed by the release agent; and the release agent coating is used as the release layer.

19. The identifiable adhesive tape according to claim 16, characterized in that the release agent is a non-silicon-based release agent.

20. The identifiable adhesive tape according to claim 16, characterized in that a thickness of the release layer is not more than 1 µm.

* * * * *